June 23, 1964 C. J. SZYCHLINSKI 3,138,131
INCLINED DECK SHIP

Filed Sept. 24, 1962 12 Sheets-Sheet 1

INVENTOR

CHESTER J. SZYCHLINSKI

BY Mason, Mason & Albright
ATTORNEYS

June 23, 1964  C. J. SZYCHLINSKI  3,138,131
INCLINED DECK SHIP
Filed Sept. 24, 1962  12 Sheets-Sheet 2
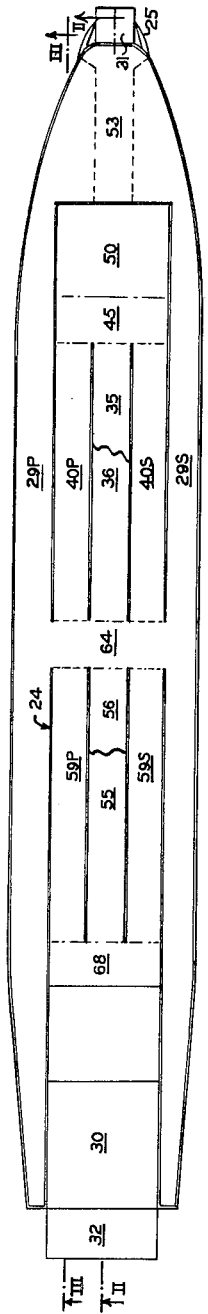
FIG. 4
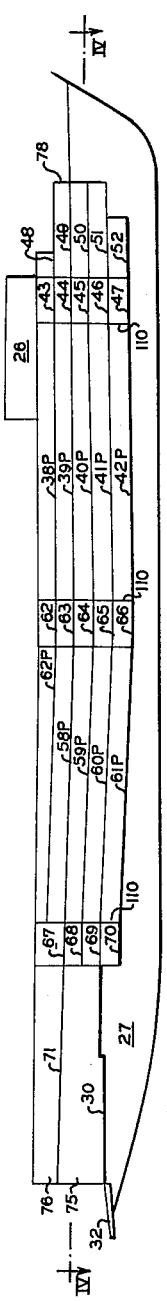
FIG. 3
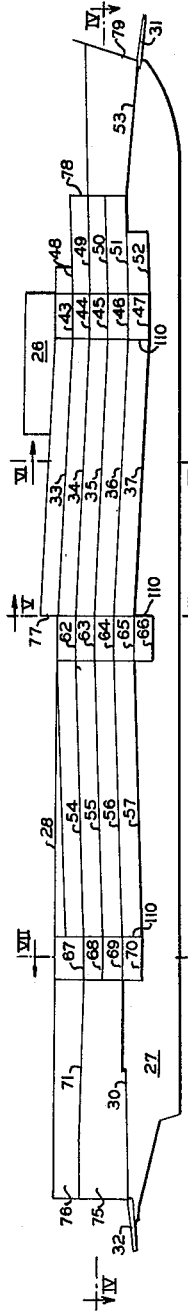
FIG. 2
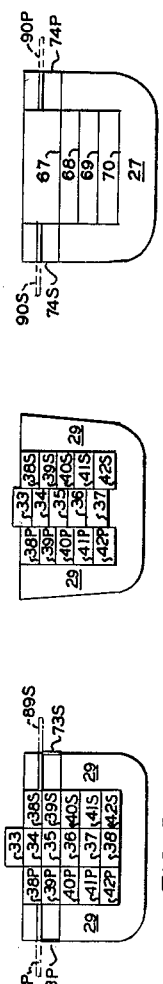
FIG. 7
FIG. 6
FIG. 5
INVENTOR
CHESTER J. SZYCHLINSKI
BY Mason, Mason & Albright
ATTORNEY June 23, 1964  C. J. SZYCHLINSKI  3,138,131
INCLINED DECK SHIP Filed Sept. 24, 1962  12 Sheets-Sheet 3

INVENTOR
CHESTER J. SZYCHLINSKI

BY Mason, Mason & Albright
ATTORNEYS

June 23, 1964  C. J. SZYCHLINSKI  3,138,131
INCLINED DECK SHIP
Filed Sept. 24, 1962  12 Sheets-Sheet 4

INVENTOR
CHESTER J. SZYCHLINSKI
BY Mason, Mason, & Albright
ATTORNEYS

June 23, 1964  C. J. SZYCHLINSKI  3,138,131
INCLINED DECK SHIP

Filed Sept. 24, 1962  12 Sheets-Sheet 5

INVENTOR
CHESTER J. SZYCHLINSKI

BY Mason, Mason & Albright

ATTORNEYS

June 23, 1964   C. J. SZYCHLINSKI   3,138,131
INCLINED DECK SHIP

Filed Sept. 24, 1962   12 Sheets-Sheet 6

INVENTOR
CHESTER J. SZYCHLINSKI

BY *Mason, Mason & Albright*

ATTORNEYS

June 23, 1964  C. J. SZYCHLINSKI  3,138,131
INCLINED DECK SHIP
Filed Sept. 24, 1962  12 Sheets-Sheet 7

INVENTOR
CHESTER J. SZYCHLINSKI
BY Mason, Mason & Albright
ATTORNEYS

June 23, 1964
C. J. SZYCHLINSKI
3,138,131
INCLINED DECK SHIP
Filed Sept. 24, 1962
12 Sheets-Sheet 8
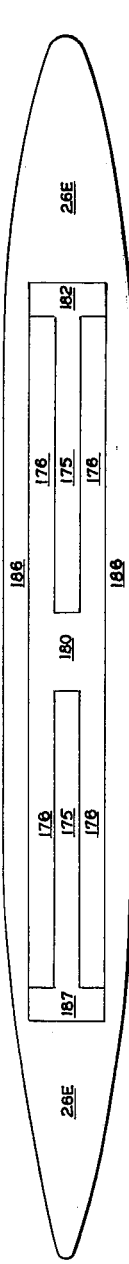
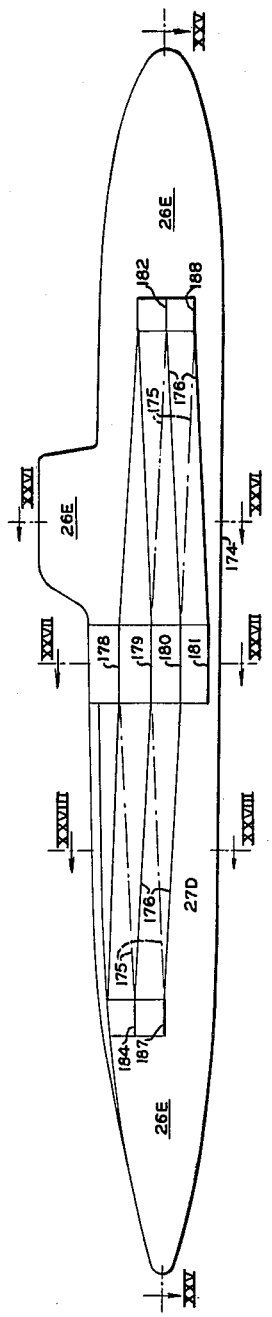
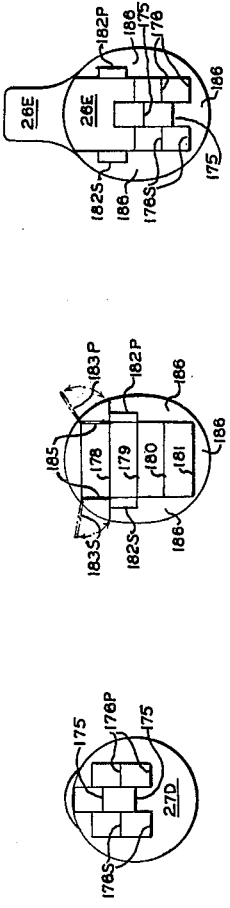
INVENTOR
CHESTER J. SZYCHLINSKI
BY *Mason, Mason & Albright*
ATTORNEYS June 23, 1964     C. J. SZYCHLINSKI     3,138,131
INCLINED DECK SHIP Filed Sept. 24, 1962             12 Sheets-Sheet 9

INVENTOR
CHESTER J. SZYCHLINSKI

BY Mason, Mason & Albright
ATTORNEYS

June 23, 1964     C. J. SZYCHLINSKI     3,138,131
INCLINED DECK SHIP

Filed Sept. 24, 1962     12 Sheets-Sheet 10

INVENTOR
CHESTER J. SZYCHLINSKI

BY Mason, Mason & Albright
ATTORNEYS

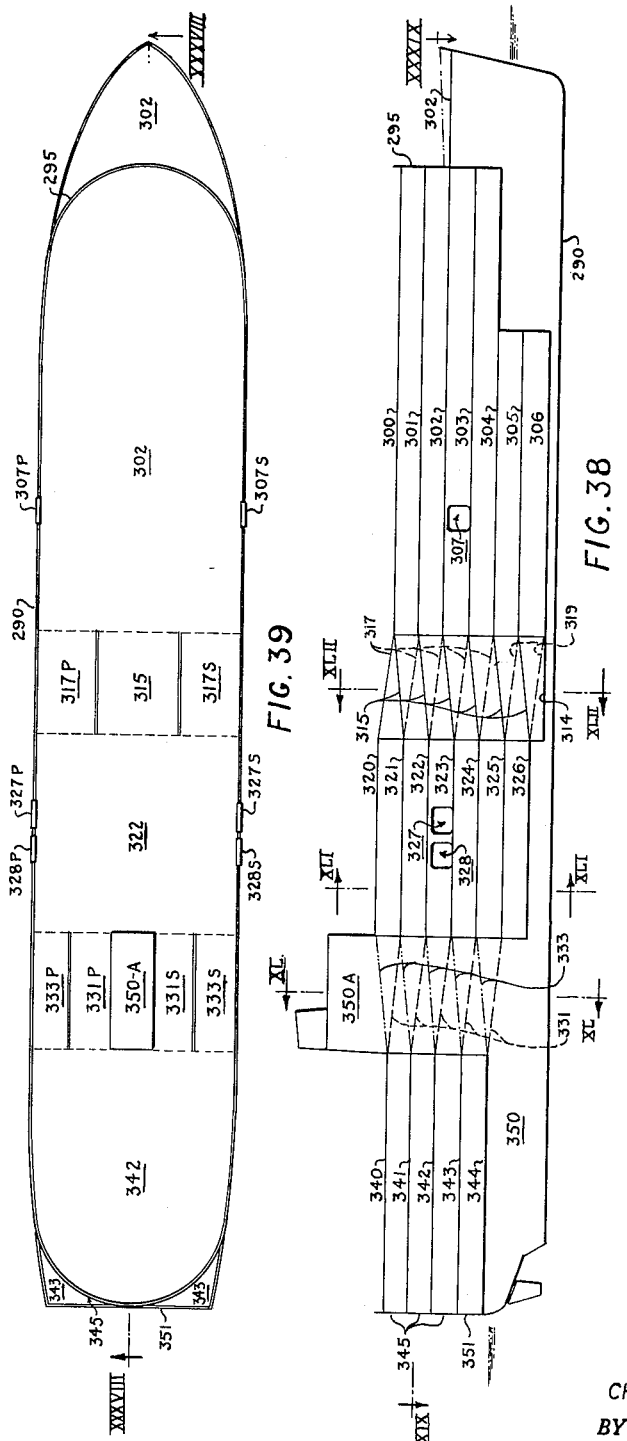

June 23, 1964   C. J. SZYCHLINSKI   3,138,131
INCLINED DECK SHIP
Filed Sept. 24, 1962   12 Sheets-Sheet 12

INVENTOR.
CHESTER J. SZYCHLINSKI
BY
Mason, Mason & Albright
Attorneys

United States Patent Office 3,138,131
Patented June 23, 1964

3,138,131
INCLINED DECK SHIP
Chester J. Szychlinski, 1715 28th Place SE.,
Washington, D.C.
Filed Sept. 24, 1962, Ser. No. 227,629
16 Claims. (Cl. 114—72)

This invention relates to improvement in the design and construction of large ships and vessels such as those employed on the Great Lakes and in ocean commerce, and more particularly introduces a vessel with a new and novel deck arrangement which provides effective storage and improved continuity in the speed of discharge and loading of cargo.

It has been recognized for some time that for efficient and economical employment of a ship, it is desirable that the "turn-around" time of the ship be reduced to a minimum. That is to say, the time spent discharging or loading or both, with its attendant demurrage should normally be kept as low as possible. Unfortunately, features in a ship considered necessary for strength, safety, effective space use and storage of cargo at sea, and the like, are frequently not in accord with efficient loading and unloading techniques.

Present cargo ships generally have a number of parallel decks with loading and unloading taking place vertically through hatches in the various decks. Inter-deck transfers are accomplished by a plethora of means such as removable hatch covers, elevators, ramps and the like. Ingress and egress from the ship are usually through hatches in the weather deck or ports provided in the hull of the ship. In this connection attention is invited to Cargo Handling Data Sheets by John R. Immer, copyright 1955, by Work Saving International, which gives examples of various contemporary standard and specialized ship designs and cargo handling equipment. Almost without exception, the specialized equipment is costly, adds substantial weight, or significantly subtracts from the available cargo space.

It is evident from the foregoing that a vessel capable both of being rapidly loaded and unloaded and of effective storage of cargo without undue impairment of the sea-going requirements of the vessel, or the necessity of costly transfer equipment, would have economies which would render such a vessel superior to existing cargo vessels.

A primary object of the invention is, therefore, to provide a new and novel deck arrangement which permits continuous movement of cargo from one deck level to another with minimal angles of inclination, minimizes space loss and allows an internal handling system which permits cargo to be moved from any part of the ship, without the need of hoisting or lifting gear, from its stowed position until it is finally delivered to the pier terminal or beach.

Decks are so arranged that they effectively constitute, a single continuous deck. The inclination of the decks is, however, minimal so that the decks may also be fully employed for storage of cargo as well as permitting the movement of cargo from one deck to another.

A special feature of the split-deck system is that no space is lost below or above these decks permitting maximum space utilization on deck areas.

The arrangement of the decks permits taking advantage of the ship's lines whereby there is fullness in the midship's sections in contrast to the more streamlined hydrodynamic form at the bow and stern of the ship; for increased cargo deck space and usable cubic capacity.

Additionally, the proposed split deck arrangement constitutes a truss which tends to brace and strengthen the ship longitudinally, and which, in turn, facilitates construction of the vessel, reduces strength requirements of the structural members, and permits construction of this nature with an increased over-all length. Moreover, a strong cellular type cross section is provided in conjunction with the angular deck configuration in the midship section of the ship which is most subject to bending due to the normal weight distribution of the ship, both loaded and unloaded.

Cargo may be loaded in this ship from the superstructure decks, through side ports, through the stern and with minor modifications, through or over the bow. The deck arrangement is such that continuous strings of cargo may be discharged as a single unit, through discharge ports even though the strings of cargo originate on different levels accessible to one another by means of inclined decks of the split deck system connecting such levels.

If desired, the entire ship may be loaded through any single cargo port access, and, conversely, discharged through any single port access. Further, the proposed deck arrangement will allow reasonable selectivity of cargo whereby various ports of call on a voyage of the ship may be served with little or no overstowage of cargo. Furthermore, the configuration of the ship with the split-deck inclined system is such that conventional deck hatches and booms and rigging may be used to complement or supplement the split deck system. The arrangement readily permits multiple routes of movement and the use of multiple loading points with little or no interference with each other.

Under normal conditions, the loading or discharge of cargo may more easily be arranged near the center of gravity of the ship and transfer of such cargo can be accomplished with minimal effect on the trim or list of the ship. It is also possible in handling cargo through the bow and stern ports purposely to take advantage of gravity and thus reduce the load on vehicles or other means employed to effect such a discharge. Damage to any portion of the cargo decks will still allow adequate alternate routes for the removal of cargo.

This concept of ship design is ideally suited to the installation of various types of automatic systems for cargo handling, including various overhead mono or multi-rails, deck rails, chain, wire, belt, roller, slot or vibrating type conveyors, and the like to provide continuous flow of cargo to loading access or discharge ports.

The design is also particularly adaptable as a specialized aircraft or helicopter ship providing adequate landing space, maintenance, support, and storage area for such aircraft and the deck feeding arrangement would provide a ready means for supplying the helicopter deck with cargo. The design may further find use in an aircraft carrier insmuch as the elevators may be eliminated and a continuous flow of aircraft to and from the flight deck may be more easily obtained.

This ship is also particularly adaptable for delivery of cargo at beaches, over a causeway or other similar port facilities where it is desirable that the cargo be discharged through the bow in a continuous flow. In like manner, cargo may be discharged or loaded through the stern into or from small craft, supplementary larger craft, barges, to ramps, etc.

The design will readily accept various types of cargo of various shapes, sizes and lengths, including unitized cargo, pallets, containers, boxcars, vehicles, trailers, automobiles, and automobile trailers. Bulk cargo may be handled with provision for the vertical bulkhead members acting as shifting boards or other means to prevent the shifting of the cargo. Further, due to the fact that the design permits a minimal number of ports, the ship is particularly adaptable for a vessel intended for part-time use as a tanker. It is to be understood, of course, that in such use, a plurality of transverse closures in the various cargo lanes is desirable, or inflatable type containers conforming to the shape of the cargo lanes can be employed. Cleaning may be accomplished by a Butterworthing system or chemical flushing or other means known to the art.

The internal decks will also readily adapt themselves to the handling of wheeled or track amphibious vehicles, tracked units or boats providing a suitable slope for launching into the sea. With suitable design of the stern section, the vessel can be employed as a floating marine railway for the repair and maintenance of various amphibious units and boats, etc.

The configuration of the decks is such that the entire cargo of the ship can be rotated internally providing a means whereby specialized manufacturing systems or processes can be carried out while the ship is underway without the need for any discharge and/or reloading of units being handled. This may, for example, be applied in the whaling and fishing industry where such arrangement would permit catching, hauling aboard, rendering, canning, freezing, stowing, boxing, etc.

The ship is particularly adaptable to mine warfare, including the assembly, maintenance, repair and modification of mines on board and the laying of such mines individually or in strings. In a like manner, buoys and other floating navigation aid can be laid, picked up and maintained.

Due to the fact that only one loading and discharge port is necessary, the design concept involved herein is advantageous for cargo submarines or other craft where closures present special problems or should be kept to a minimum.

Existing ships such as the LSD, LST, tankers, Maritime C-types, including the C-4 C1MAV1, etc., may readily be modified to incorporate and employ the continuous deck concept of this invention.

Another major advantage of this inclined deck design is that although failures or break-downs might occur in automatic systems or cargo handling devices employed, such break-downs do not necessarily eliminate the possibility of removing the cargo from the ship. All cargo, as long as it is compatible to the arrangement and deck size or port size incorporated into the design of the ship, may be moved by various makeshift or supplementary devices along the inclined deck arrangement to any desired cargo access or discharge point. This feature is particularly desirable in military vessels where cargo handling gear may be made inoperative due to enemy action.

These and other objects and advantages of the invention will be pointed out or will occur to those skilled in the art from a reading of the following specification in conjunction with the accompanying drawings.

In the drawings:

FIGURE 2 is a view in section taken on line II—II of FIGURE 1;

FIGURE 3 is a view in section taken on line III—III of FIGURE 4;

FIGURE 4 is a plan view in section taken on line IV—IV of FIGURES 2 and 3;

FIGURE 5 is an amidships view in section taken on lines V—V of FIGURES 1 and 2;

FIGURE 6 is a forward view in section taken on lines VI—VI of FIGURES 1 and 2;

FIGURE 7 is an after view in section taken on lines VII—VII in FIGURES 1 and 2;

FIGURE 24 is a vertical profile view of a cargo submarine embodying this invention;

FIGURE 25 is a plan view of FIGURE 24 taken along section lines XXV—XXV;

FIGURE 26 is a view in section taken on section line XXVI—XXVI of FIGURE 24, looking aft;

FIGURE 27 is a view in section, taken on section line XXVII—XXVII of FIGURE 24, through the transfer deck area, looking aft;

FIGURE 28 is a view in section, taken on section line XXVIII—XXVIII of FIGURE 24, at the transfer deck, looking aft;

FIGURE 38 is an inboard profile view in section showing the deck arrangement in a vehicle carrier taken on line XXXVIII—XXXVIII of FIGURE 39.

FIGURE 39 is a plan view in section taken on line XXXIX—XXXIX of FIGURE 38;

FIGURE 40 is a section view taken on line XL—XL of FIGURE 38;

FIGURE 41 is a midship section view taken on line XLI—XLI of FIGURE 38;

FIGURE 42 is a section view taken on line XLII—XLII of FIGURE 38; and

This application is a continuation-in-part of my application Serial Number 843,497, filed September 30, 1959, now abandoned.

Figure 1:
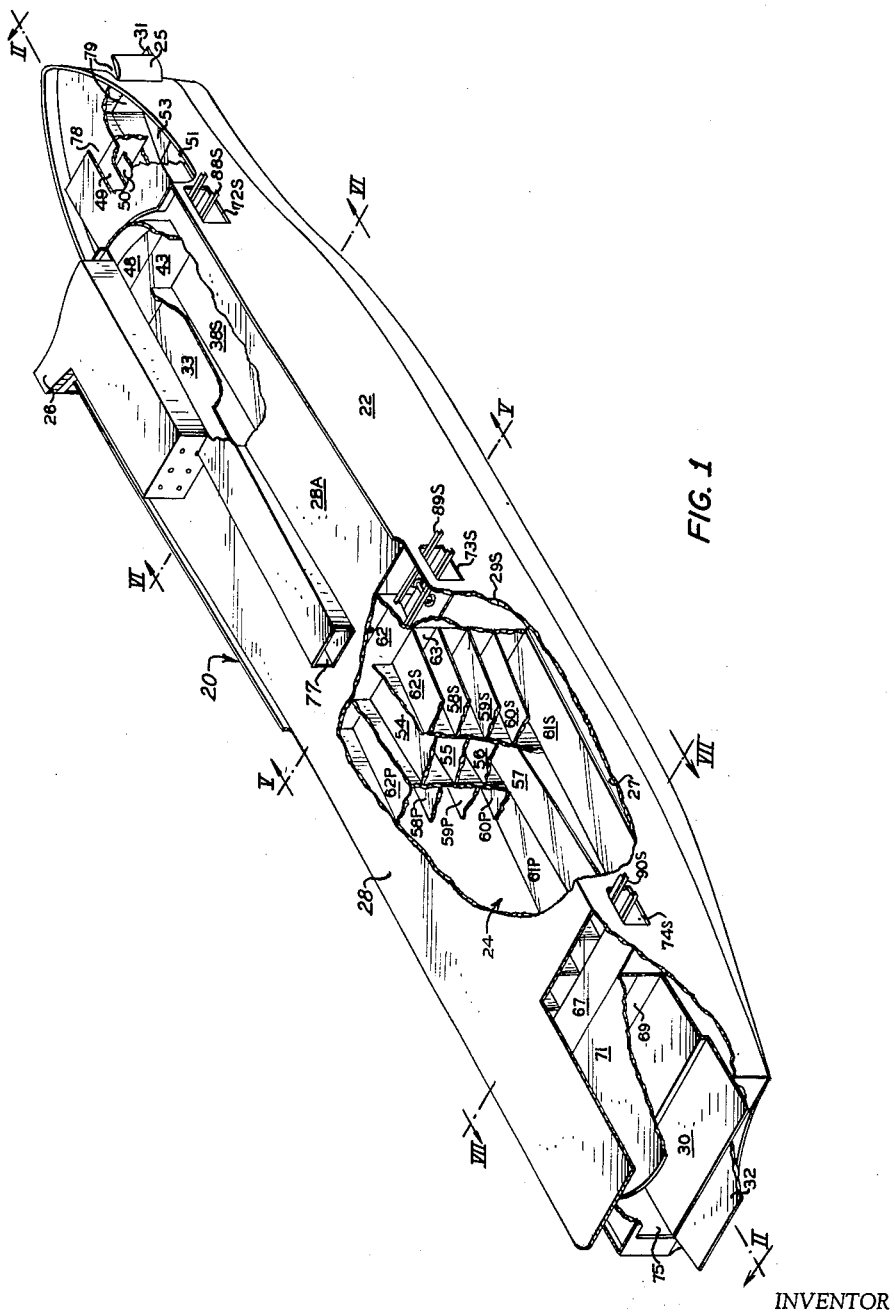
FIGURE 1 is a perspective view of a vessel embodying the present invention with cut-out portions showing the specific deck structure.

Referring now to FIGURES 1 and 2, the vessel 20 has a general hull 22, the configuration embodying features of an LSD and an LST in order to take full advantage of the capabilities offered by its unique interior cargo deck configuration.

The bridge and superstructure deck house 26 are illustrated forward in this configuration to allow for an aircraft and helicopter deck 28. The house 26 accommodates navigation facilities, radio shack, officers' quarters and such other spaces normally assigned in ships to such areas.

Crew berthing, messing spaces, offices, ship's stores, workshops and other similar features for crew comfort and ship operation and maintenance are located below the flight and superstructure decks 28 and 28A, on the port and starboard sides of the ship in area 29, forming the boundary of the special cargo deck configuration designated collectively by the numeral 24.

The engine room in this design would be located in area 27.

It is to be understood that the invention herein claimed does not involve specific details of the actual location or design of quarters, facilities, propulsion spaces, and the like, which are not directly associated with the cargo deck arrangement.

Conventional bow doors 25 and a ram 31 of a type and construction to be found in a normal LST or similar type of landing or beaching ship or craft are located in the bow of the ship.

A stern gate 32 and stern well 30 similar to the arrangement and construction to be found in a normal LSD or similar type of ship using a floodable well are located in the stern of the ship.

As will be observed in FIGURES 1, 4, 5, 6 and 7, the entire cargo deck structure 24 is located primarily in the central portion of the ship.

Referring particularly to FIGURE 2, the forward centerline or central decks 33, 34, 35, 36 and 37 are inclined slightly upward toward the center or amidships section of the ship. Deck 33 feeds directly to the flight deck 28. On either side of the aforementioned central decks 33, 34, 35, 36 and 37 are sets of decks oppositely inclined. The starboard inclined decks from top to bottom are designated 38S, 39S, 40S, 41S and 42S, and those on the port side are correspondingly designated 38P, 39P, 40P, 41P and 42P. It will be noted that these starboard and port decks conform generally to the normal sheer curve of the ship and are inclined upward and forward from the center or amidships section of the ship. The central, port and starboard decks meets at the forward lateral transfer decks 43, 44, 45, 46 and 47, respectively, these transfer decks being parallel to the base line of the ship. To be more specific, it will, for example, be noted that decks 33, 38P and 38S meet or adjoin at a common level at transfer deck 43.

Forward of transfer decks 43, 44, 45, 46 and 47, are further connecting or platform decks, 48, 49, 50, 51 and 52, respectively, which may run the full width of the ship, if desired, as far forward into the bow of the ship as the cargo area or other design requirements may dictate. The shape of these decks will normally be governed by the forward convergence of the bow shape and structure. These decks may favor the sheer of the ship, or may be constructed parallel to the base line of the ship, as a matter of design choice or as may be dictated by cargo requirements.

It will be noted from FIGURE 1 that the deck 48 in FIGURE 1 is illustrated with a curved forward boundary.

This type of deck configuration is desirable to accommodate the turning of vehicles, where such cargo may be carried. Decks 48, 49, 50, 51 and 52 and also extensions of after transfer decks 67, 68 and 70 may all be similarly designed.

The bow access port 79 and forward feeder deck 53 are shown in FIGURES 1, 2 and 4. At sea, the ramps 31 and 32 will be raised in the doors 25 closed, as is practiced in contemporary LSD and LST type ships.

In the after portion of the ship is a deck configuration similar to that described in the forward section. Thus it will be observed that decks 54, 55, 56 and 57 aft, on the center line, are inclined longitudinally upward toward the central or amidship section. On either side of the after central decks are sets of decks inclined slightly downward from the after portion of the ship and which conform generally to the after sheer of the ship. These decks are designated as 58S, 59S, 60S and 61S on the starboard and 58P, 59P, 60P and 61P on the port sides, respectively.

As shown particularly in FIGURE 2, the foregoing after and forward decks meets at the center or amidships transfer deck areas, 62, 63, 64, and 65. These transfer decks are parallel to the ships' base line.

The after center-line or central decks 54, 55, 56 and 57, the after starboard inclined decks 58S, 59S, 60S and 61S, and the after port inclined decks 58P, 59P, 60P and 61P meet at the after transfer decks 67, 68, 69 and 70. That is to say, for example, that decks 54, 58P, 58S, 34, 38P and 38S meet at transfer deck 62.

Leading aft from transfer deck 62 are, on the starboard and port, inclined decks 62S and 62P, respectively. These decks decrease in height and lead to a dead end at transfer deck 67. They may be used for cargo, firefighting equipment, or any number of purposes.

Additional cargo space is available in the after well deck 30 and above on deck 71. These deck areas are conventional and similar to those normally found in an LSD. An additional cargo port 76 is available to after deck 71. There are side ports 72S and 72P (not shown) in the ship's hull leading from the forward transfer deck area 44. Similarly, amidships there are side ports 73S and 73P from transfer deck 63 and aft side ports 74S and 74P lead from transfer deck 67.

It will be noted that cargo can be loaded or unloaded in a continuous flow, through cargo accesses 75 and 76 at the stern, 77 and 78, in the superstructure, through the bow access 79 and through side ports 72S, 72P, 73S, 73P, 74S and 74P, using them, if desired, either singly or simultaneously.

Vehicles or automobiles capable of moving under their own power and on their own wheels may be readily driven aboard through any of the port accesses mentioned and into final position at the stowage location desired via the various inclined decks and transfer decks.

Palletized cargoes may be delivered to the ship by ramps, conveyorized delivery systems, boats, barges, aircraft, or placed on board by shore or ship cranes as desired. Once on board such cargo could be moved into final stowage position by various rolling devices such as dollies, rollable pallets, trucks, fork-lift trucks or through the use of an entirely automatic feeder system, or through a combination of these means.

Unitized cargo, that is the combination of various small packages, units or groups of pallets on or in a larger unitizing device or supporting rig, may be handled in a manner similar to that described before handling individual pallets.

Containers also may be delivered in a like manner to that described for handling pallets. They could be routed about the ship to final stowage position through the use of various types of known conveyorized systems which might include overhead mono or multi-rails with appropriate supporting rigs which would readily support such heavy loads, or deck rails, conveyorized rollers, chain conveyors and so forth, or on their own wheels, if so equipped. In connection with container sizes, it is to be noted that limitations on their length is not as critical as that encountered in present day container ships using restrictive cellular loading, and containers of variable length could easily be accommodated together in the same cargo deck area. The cross section of the cargo decks could readily be designed to accommodate standard sizes, and as such standardization is evolved, more effective space utilization in the ship would be achieved. Further, since stacking of containers will not be necessary, the containers need not embody the structural strength required for containers which are stacked, and consequently a lighter and cheaper container may be employed.

To give an example of cargo loading, a series of containers might loaded through side port 73 by ramps (not shown) or supporter 89S. A portion of these containers are taken down from transfer deck 63 by central deck 55 to transfer deck 68, down inclined decks 59S and 59P to transfer deck 64, down central deck 56 to transfer deck 69, down inclined decks 60S and 60P to transfer deck 65, down central deck 57 to transfer deck 70, and down inclined decks 61S and 61P to area 66. As loading progresses, these decks would, of course, be filling up. A portion of the cargo might also be sent from transfer deck 63 up the inclined decks 58P and 58S to transfer deck 67 and up central deck 54 to transfer deck 62. Part of the containers may be diverted to the stern well 30 and deck 71. In the same manner, the containers may be stowed in the forward portion of the ship through the side port 73S, as well as any of the other side ports. Of course as a practical matter, several cargo accesses will usually be employed. Discharging may be the reverse of loading, but it will be appreciated that the "last-in-first-out" rule does not apply here. The inherent flexibility of the system permits storage of cargo which will be discharged first near a cargo access port irrespective of the fact that it may have to be loaded first. Thus, in effect, cargo may be "poured" rather than "spooned" into and out of the ship, and this may be accomplished in a selective manner. This contrasts markedly with existing cargo handling techniques.

A study of FIGURES 1 through 4 will readily reveal the ability of this design to handle special cargoes of unusual length because of the longitudinal configuration of the inclined decks. For example, in the average design which might incorporate this decking arrangement, lengths of 150 feet could be accepted as long as their cross sections fall within the limitations imposed by the designed cross section of an individual inclined deck lane.

Figure 8:
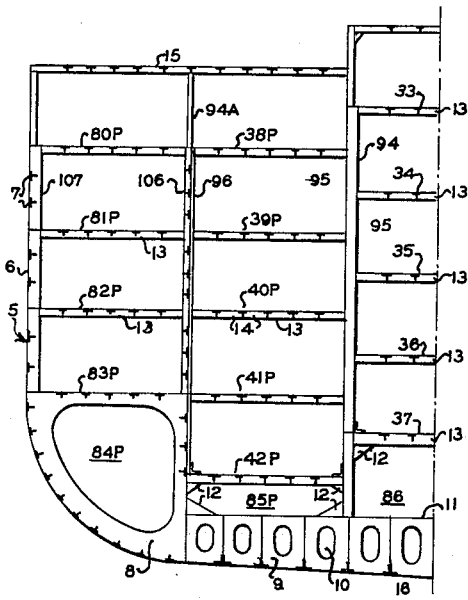
FIGURE 8 is a detail view in half-section taken on lines VI—VI of FIGURES 1 and 2.

Referring now to FIGURE 8, a half-section port detail is shown, taken through a typical section of the ship in way of the inclined decks, and corresponds more or less to the section shown in FIGURE 6. The starboard side would be similar in construction. Decks 33, 34, 34, 36, 37, 38P, 39P, 40P, 41P and 42P have been previously described. The decks 80P, 81P, 82P and 83P are shown as lateral continuations of the inclined cargo decks 38P through 41P, conforming generally to the sheer of the ship. It must be pointed out the these outer decks, 80P, 81P, 82P and 83P could be constructed parallel to the base line of the ship, which would cause some vertical displacement with the adjoining inclined cargo decks. By permitting conjunction with the starboard and port inclined cargo decks in the way of the lateral transfer decks, as shown in FIGURE 8, these outer decks provide additional cargo space. In FIGURE 1, these outer decks are located in area 29. The outer decks therefore are incorporated to provide crew berthings, storerooms, offices, additional cargo space, in the basic embodiment in FIGURE 1, and so forth. Further, these decks might also serve as troop accommodations in ships built for military use or as passenger accommodations where commercial designs are employed.

Areas 84P, 85P and 86P are located below the cargo decks and would normally be reserved for ship's stores, various bulk cargoes, bunkers, ballast, boiler feed water, fresh water, and so forth, although they may be also used for additional cargo space. As governed by the inclined cargo decks, these spaces would vary in height along the length of the ship. This feature can be observed by a study of FIGURES 2 and 3.

All the decks illustrated may be secured in place in any conventional manner known to those skilled in the art, as for example, riveting or welding to appropriate vertical bulkheads, columns or extruded shapes decided upon to meet the special applications for which the ship is to be designed.

The vertical stanchions 94 along the central longitudinal cargo space may be extruded shapes or possibly columns depending upon the purpose for which the ship was built. The sheathing 95 may consist of relatively light plating or possibly angle-iron, at various vertical intervals to provide a reasonably smooth cargo cell (separation for cargo units), or this entire construction may be left relatively open except as necessary to provide vertical support or rigidity to the ship. The plating 96 in this particular configuration provides a water-tight bulkhead separating the cargo spaces or areas from accommodation spaces 29P (FIG. 1). Bulkheating 106 and 107 would be determined or governed by the use of the spaces in which it was installed, depending upon whether the spaces would be for accommodations or additional cargo stowage.

In FIGURE 8, water-tight hatches may be placed below the lower inclined decks 37, 42P, 42S (not shown), 83P and 83S (not shown) along the length of the ship, for further cargo stowage. Such cargo spaces may be used for special cargoes or cargoes not normally compatible or capable of being stowed or mixed with cargo in inclined deck areas. Such spaces take advantage of volume not required for bunkers, ballast, water, etc. Cargo removed from such lower areas or spaces is raised or lifted only to the lowermost inclined cargo deck, about 10 feet, simultaneous with discharge of other cargo, for removal from the ship via inclined decks, as opposed to the present practice of raising cargo 40 feet or more. Greater speed of cargo removal from the holds is therefore achieved in such lower areas.

It will be noted that a longitudinal web frame construction similar to tanker construction is employed. However, transverse frame construction as found on most cargo ships, Isherwood construction, or other known types of construction may be employed. The hull 5 is secured to frame 6 and T-bar stringers 7. At the turn of the bilge there is a web frame 8 secured to the hull 5, frame 6, and stringers 7, as shown. At its inboard lower portion, web frame 8 is secured to the double bottom frames 9 having lightening holes 10. Longitudinals 16 running fore and aft are secured to hull 5 at their lowermost portions and to the ceilings 11 above. Brackets 12 are appropriately placed to brace the columns and stanchions 94. The decks are supported by the horizontal deck beams 13 which are secured in the central portions to the vertical stanchions 94 and 94A and outboard to frame 6 and vertical stanchion 94A. Deck stringers 14 are secured fore and aft to said deck beams 13. A shelter deck 15 is provided over decks 80P and 38P.

In the embodiment portrayed in FIGURES 2 through 7, five sets of decks forward and four sets of decks aft are shown. These decks are approximately ten feet apart vertically. There is no specific height or distance requirement, however, and no magic is involved in the number of decks or heights between them. Such heights would be regulated by the type of cargo the ship was designed to carry. It is important, however, that the angle of slope from the horizontal of the inclined decks be nominal in order to resist undesirable movement of stowed cargo when the ship is pitching and rolling.

It is recommended in this and all embodiments of the invention that the slope angle be 4° or preferably less. When the slope is significantly higher, such as 7° or more, the advantages incident to the continuous deck concept begin to be offset by the need for special deck cargo securing means together with an undesirable reduction of cargo safety. In the design portrayed in FIGURE 1, it is possible to achieve deck slope gradients of about 2½° which is so minor as to give the effect of level decks for practically all cargo handling purposes. Most modern ships are of a length and have deck heights which would permit similar gradients to decks of the inclined nature, herein described, if modified to accommodate such design feature.

In effecting discharge through the stern of the ship portrayed in FIGURE 1, trimming the ship by the stern would improve discharge through after ports due to the leveling off of the after outboard inclined and forward central decks and increased pitch of the after central and forward outboard inclined decks. Conversely, discharging through the bow could be improved by trimming the ship by the bow. As such trimming measures are normally employed in handling ships with stern and bow ports, the inclined deck arrangement is peculiarly and favorably adaptable to such ship types.

Essentially, the slope angle or gradient previously described is achieved by an approximate displacement of one-half deck height between the amidship transfer decks and the forward and after transfer decks. These decks are indicated in FIGURE 2 as 43 to 47 forward, 62 to 66 amidships, and 67 to 70 aft.

If necessary to consider water-tight integrity in specific designs, various water-tight doors 110, FIGURE 3, could be incorporated to restrict or limit flooding to specific cargo lanes. Roller-type water-tight doors or pivoted water-tight doors could be utilized, without appreciably affecting the flexibility of cargo handling in the design. An example of water-tight doors may be found in Patent No. 541,253, or in the USNS Comet.

In respect to water-tight doors, no effort is made to design a specific type of door for the cargo lanes, and in certain embodiments, such doors will be desirable in the lower cargo decks. A door to meet the requirements can, however, easily be fabricated by those familiar with this specialized art. Such doors may include some sort of rubber or other suitable gasketing forming the peripheral framework of the cargo lane in the areas in the transfer decks or such other locations as would be called for in the final design of a ship incorporating the inclined deck configuration described in this invention. In this connection, the water-tight doors so incorporated could include the cargo handling system as part of their structure. For example, a door normally closing a cargo lane might be so pivoted that when the door was raised, the back of such door could include a mono or multi-rail handling system. When such a door was raised to the overhead in the transfer deck area, the rail system, on the lower side of the door in this position, would form the ceiling of such transfer deck area. This arrangement, therefore, would permit the overhead cargo handling system in a specific cargo lane to tie in, in the transfer deck area, with the rail system of the water-tight door providing a means for moving cargo from one cargo lane into the transfer area, thence through a side-port, or toward the center of the ship in the transfer deck area and thence to another cargo lane to permit a continuous flow of cargo.

Figure 9:
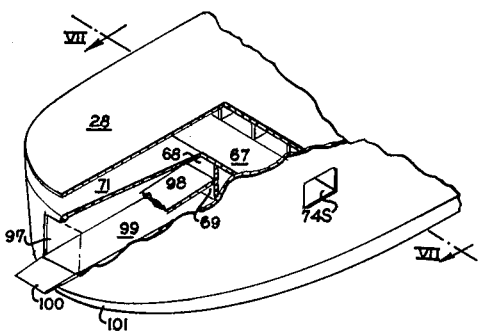
FIGURE 9 is a perspective view of a stern modification of FIGURE 1 with a cut-out portion to show specific structure.

Referring once more to FIGURE 1, it must be pointed out that this illustration describes an embodiment with cargo handling capability through a large number of access or discharge ports such as might be desirable in military designs. However, it is apparent that many various modifications are possible. For example, the bow port may be eliminated where it is not needed in a given service, and a conventional more streamlined bow may be used to improve ship speed through the water. Such a modification would eliminate deck 53 illustrated in FIGURES 1, 2 and 4. Also, the stern may be modified if discharge into the water or water-borne craft were not required or desired. A stern with a finer run and a discharge port located higher in the stern may thus be employed. This is illustrated in FIGURE 9 where 101 shows a finer stern to improve ship speed, a higher stern port 97 which is normally closed by stern door 100. A precedent for this type of access has been made in the case of the recently launched USNS COMET. The stern port access feeds or discharges via deck 99 into the ship across the transfer deck 69, FIGURE 9. An adjustable ramp 98 (shown partly cut in FIGURE 9) is employed to permit feeding directly onto transfer deck 68, FIGURE 9, thereby improving the flexibility and selectivity of cargo directed through the port. Further access to the cargo area may still be achieved through the use of deck 71 which feeds transfer deck 67.

Both the bow and stern accesses of the ship can be eliminated whereby the entire ship's cargo will be handled by the side ports 72S, 72P, 73S, 73P, 74S, 74P. Ports 78 forward and 77 on the flight deck 28, as illustrated in FIGURE 2, may also be eliminated. In this case, siporters 88S, 89S, 90S, 88P (not shown), 89P and 90P, of a design already developed and being used, as described in Cargo Handling Data Sheets by John R. Immer (1955) can be employed to move cargo from the terminal facility to the ship or vice versa. Such siporters are shown leading from the side ports 72S, 73S, 73P, 74S and 74P in FIGURES 1, 5 and 7. Siporter 88P leads from side port 72P. Such a system is particularly desirable in a passenger-type vessel where maximum space is usually desired for passenger accommodations. As has been previously stated, the ship lends itself to the discharge of the entire cargo through a single port access as long as such cargo is adaptable to the shape and size of the cargo port access, lanes or decks, or the handling gear and/or systems employed.

Figure 10:
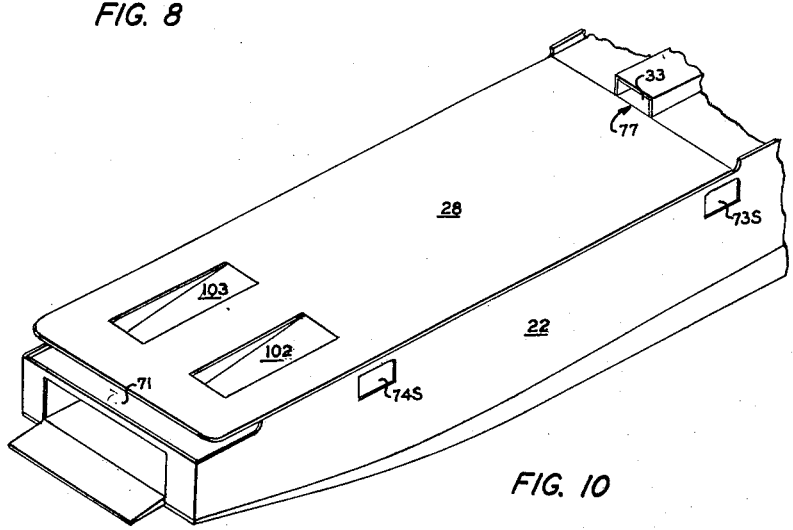
FIGURE 10 is a perspective view of a modification of FIGURE 1 showing additional access ports to and from an aircraft or helicopter deck.

FIGURE 10 illustrates a modification of FIGURE 1 which provides an improved cargo handling capability to and from the aircraft or helicopter deck 28. Adjustable cargo ramps 102 and 103 are installed to handle cargo from deck 71 to deck 28 to supplement the cargo which could flow via deck 33 through port access 77.

Figure 12:
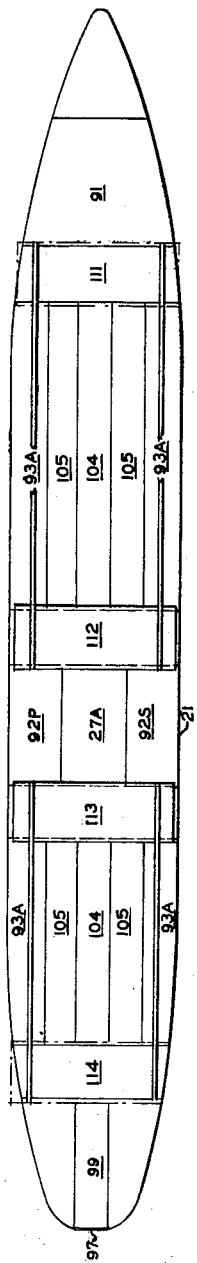
FIGURE 12 is a top plan view of the ship shown in FIGURE 11.
Figure 11:
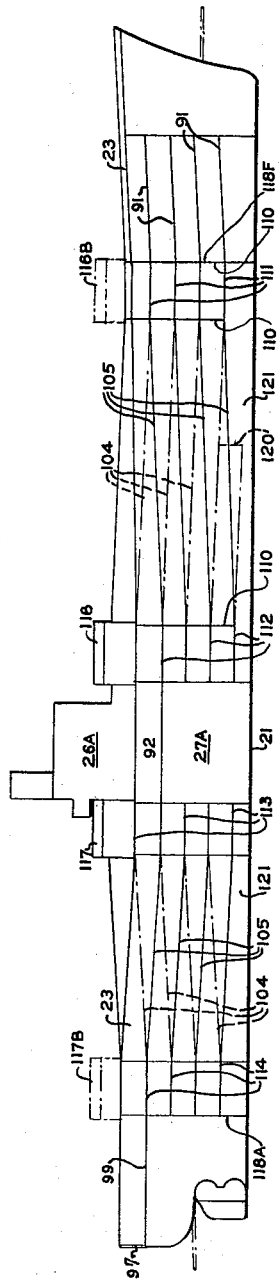
FIGURE 11 is a vertical profile of a conventional cargo ship having the engine room amidships, embodying the deck arrangement of the invention.
Figure 14:
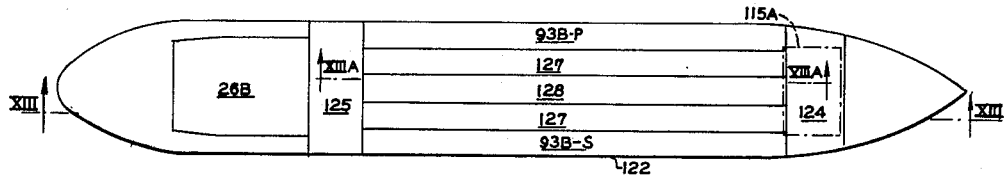
FIGURE 14 is a plan view of the ship shown in FIGURE 13.

Referring to FIGURES 11 and 12, showing the inclined deck arrangement in a conventional cargo ship 21 with the engine room 27A and house 26A amidships, the inclined deck arrangement is basically the same as that indicated in the embodiment shown in FIGURE 1. Decks 104 in FIGURES 11 and 12 collectively correspond to decks 54, 55, 56 and 57 in FIGURE 2. Inclined decks 105 in FIGURES 11 and 12 correspond collectively to inclined decks 58P, 58S, 59P, 59S, 60P, 60S, 61P and 61S in FIGURE 3.

The transfer decks 111, 112, 113 and 114 are similar to those previously described. It will be noted, however, that transfer decks 112 and 113 are provided on each side of the engine space 27A. The decks 91, a continuation of the transfer decks 111 forward, are also similar to the corresponding decks 49 through 52 (FIGURES 2 and 3) previously described, and these decks may conform generally to the sheer line of the ship or be constructed parallel to the base line of the ship.

A stern feeder ramp 99 through stern access 97 is comparable to the system illustrated in FIGURE 9 and serves the same purpose in handling cargo.

No effort has been made to specify a particular width to the decks, and it can be readily seen that the fine lines in the ship at 118F and 118A (forward and aft, respectively) would affect the width of transfer decks 111 and 114 in the lower portion of the ship. This is a design problem which would be governed by the type of cargo which the ship might be required to carry and the longitudinal extent of the decks.

The forward inclined-deck configuration is joined to the after inclined-deck configuration by means of decks 92S and 92P on either side of the engine room casing 27A, which may serve as a stowage deck and which also readily permits movement of cargo from forward aft, or aft forward.

In this embodiment, overhead traveling siporters 116 and 117 are illustrated to show a possible arrangement for this type of equipment in handling cargo. This equipment may be similar to the cargo van cranes built by Skagit Steel and Iron Works and installed on converted C–2 container ships such as operated by the Pan-Atlantic Steam Ship Co. or to those disclosed on page 28 of the Journal of ICHCA, Vol. VI, May 1959. These overhead siporters are capable of working cargo through hatches (not illustrated) which may be installed in transfer decks 111, 112, 113 and 114. The foremost and aftermost working positions of the siporters are indicated by dotted lines, in FIGURE 11, as 116B and 117B respectively.

As this particular type of ship will usually have finer lines than the ship illustrated in FIGURE 1, 120 shows a possible termination of the central cargo lane 24A in the forward part of the ship. A specific location of this point is not intended to be portrayed herein, and such lane can reach fully from transfer deck 112 to 111 with some sacrifice to the height of the cargo lane.

The areas 93A in FIGURE 12 illustrate the extensions of the inclined decks to skin of the ship and would be comparable to the areas designated by 80P, 81P, 82P and 83P (previously described herein) of FIGURE 8. It will be understood, of course, that these decks may be eliminated entirely and the chief reason for their existence is to insure water-tight integrity. Preferably, these decks should conform to the sheer of the ship. It is possible, however, to build them parallel to the base line of the ship in such a manner that they will meet inclined decks 105 at the transfer decks 111, 112, 113 and 114 only. Their function is comparable to that previously described for deck areas 80 through 83 of FIGURE 8.

This ship handles cargo in basically the same manner as that previously described and is capable for handling containers, unitized cargo, palletized cargo and vehicles, or bulk cargoes if the decks are suitably designed to accommodate such cargo. It can be readily seen that a conveyorized system would enhance this design in providing for a continuous flow of cargo from the lowermost depth of the ship to final position of discharge at an uppermost deck, or via siporter, side ports (in the vicinity of transfer decks), or by conventional cargo gear in the vicinity of transfer decks at hatches 111 through 114.

As this ship deviates from the norm in respect to transverse bulkheads, fire doors, water-tight bulkheading, or water-tight doors may be provided as required. Such water-tight doors installed at ends of cargo deck lanes would serve to close off vulnerable cargo areas of the ship. Typical positions for such doors or bulkheading are designated 110. These should, of course, be installed in adequate number to suit damage control requirements of specific ship designs.

The areas 121 beneath the cargo deck arrangement will normally be utilized for ballast, bunkers, fresh water, etc., as previously described for the embodiment of the ship in FIGURE 1.

Where greater selectivity of cargo is desired, it is possible to place removable hatches, retractable hatches or rolling decks in the transfer deck areas designated 111 through 114 to permit handling of cargo from any specific intermediate transfer deck position. A vertical type conveyor system may be employed to supplement the internal inclined-deck conveyor system in special cases where packaged or palletized cargoes are being handled.

Figure 13:
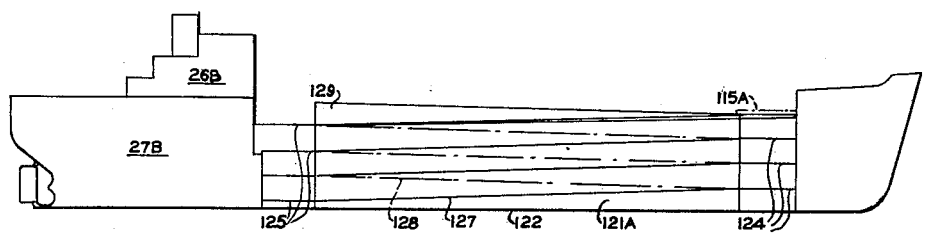
FIGURE 13 is a longitudinal profile view of a small ship with an engine room aft, similar to the C1–MAV1 or LST types, embodying this deck design.

Referring to FIGURE 13, this ship 122 incorporates the inclined-deck arrangement using only two transfer decks 124 and 125.

The navigation bridge and quarters 26B serve the same purpose as that described for 26 in FIGURE 1, except that in this ship these arrangements are located in the after part of the ship.

The engine room arrangement 27B is essentially similar to that described for 27 in FIGURE 1.

The inclined decks 127 and 128 of this design are essentially the same as has been previously described for the forward inclined decks in FIGURE 2.

The inclined decks 128 slope upward and aft from transfer decks 124 to 125 along the center line section of the ship.

The inclined decks 127 slope upward and forward from transfer decks 125, generally following the normal sheer of the ship, and terminate at transfer decks 115. The decks 127 would be outboard of the center line decks 128.

Figure 15:
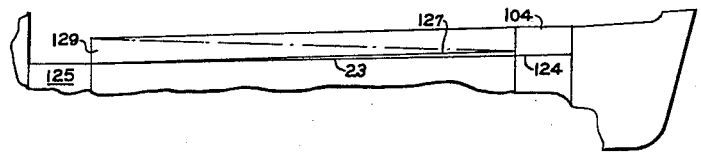
FIGURE 15 is a fragmentary section showing a modification of the ship of FIGURE 13.

Referring to FIGURE 15, this sectionalized view shows an arrangement having an extension of the decks 127 from transfer deck 125 to transfer deck 124. By using this arrangement it is unnecessary to handle cargo through a hatch 115A, in the horizontal deck of the ship, and cargo may be moved off the ship through side-port type accesses 104.

Cargo handling on this ship is essentially similar to that described previously for the ship in FIGURE 1. Vehicular, containerized, unitized and palletized, and, with suitable decking, bulk cargoes may be readily handled. Cargo may be lifted from the ship to the shore using conventional standard booms in the vicinity of transfer decks 124 and 125, if desired.

A siporter, previously described for the ship in FIGURES 11 and 12 (similar to 116) may be incorporated in this design.

To achieve maximum cargo flow continuity, the entire ship may be conveyorized, and such conveyorized cargo further directed to a conveyorized system ashore by means of a suitable conveyor connection, over a ramp, from ship to shore.

In this particular design cargo areas 93B–S and 93B–P may be developed as separate decks or extensions of decks 127. These cargo areas will then have a common conjunction with the inclined deck system at transfer decks 124 and 125. Or these decks may be built parallel to the base line, if desired. It will, of course, be fully understood that these decks may be eliminated entirely, and inclined decks 127 would extend to the hull.

To suit the requirements of a specific trade, decks at 93B–S and 93B–P may be eliminated entirely and bulk cargoes could be carried in these areas, giving the ship a dry and bulk cargo capacity. It is expected that bulkheading between decks 93B and the inclined deck system will be water-tight to improve the damage control features of this ship.

The double-bottom area 121A of FIGURE 13 may be used for the same purposes previously described for 121 of FIGURE 11.

This small ship would appear to be particularly suitable for handling bulk cargoes through the use of vibrating-type conveyor systems incorporated into the inclined decks. It can readily be seen that such bulk cargoes would stow very readily with the cargo gravitating down the incline of the decks. It can further be seen that removal of such bulk cargoes could be easily accomplished by drawing off in the vicinity of the low point of the central inclined decks in the ship.

A ship of this type is very adaptable to the Great Lakes foreign trade which might involve carrying the various cargoes previously mentioned, serving as a combination package and bulk carrier.

Figure 13A:
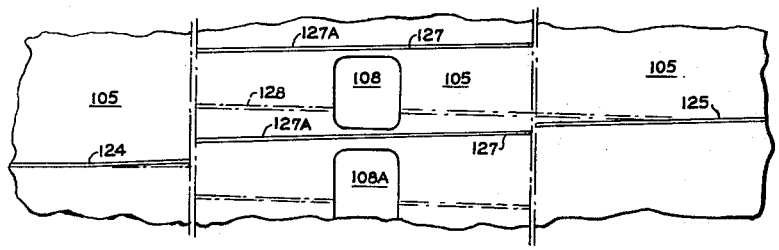
FIGURE 13A is a broken enlarged sectionalized view taken along section lines XIII-A—XIII-A of FIGURES 13 and 14.

Referring to FIGURE 13A, this figure illustrates how access to areas 93B–S and 93B–P may be gained via inclined decks 127.

By installing water-tight doors 108 and 108A in the bulkhead 105 which forms the margin of the inclined cargo deck area 24B, cargo may be stowed or removed in various sections of 93B. Such cargo would normally move into and out of the area 93B from inclined cargo decks 127.

In this illustration a flat area 127A in front of door 108 is shown in the run of deck 127 between transfer decks 124 and 125. Such flat area might be required where the inclination of the deck 127 is such as to make cargo handling through door 128 awkward or inconvenient.

This arrangement gives the design more flexibility in handling those areas or spaces outboard of the inclined deck cargo area. The doors 108 illustrated herein may be located anywhere along the longitudinal run of the inclined decks 127. No specific vertical location is intended in this portrayal and the location of such doors is governed by the design of the ship and the locations where such cargo accesses are desirable.

The need for such additional cargo spaces may occur where refrigerated or special bonded cargoes are included in ship loading and where it is undesirable to store cargo of this nature in inclined deck areas.

Although the access hatches are described or portrayed with this specific design, it must be pointed out that this type of hatch feature may be included in most of the designs portrayed in this invention.

As has been previously stated, the decks in areas 93B–S and 93P may be extensions to decks 127, illustrated herein, or may be parallel to the base line. In the latter case, it can be appreciated that the hatch 108 normally is installed at such point where the decks of area 93B and 127 are in common conjunction, to permit ready movement of cargo from such spaces into the inclined deck areas.

Figure 17:
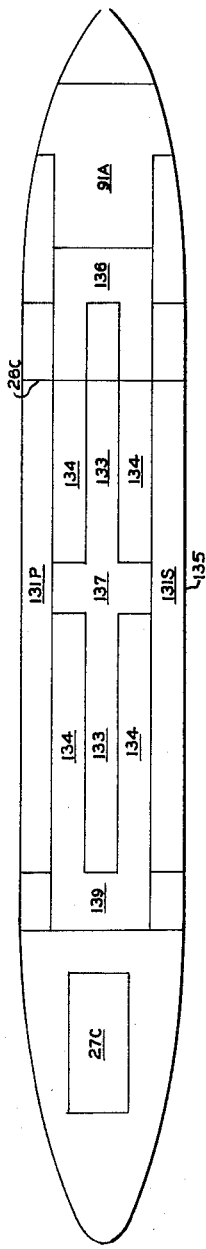
FIGURE 17 is a plan view of the ship shown in FIGURE 16.
Figure 16:
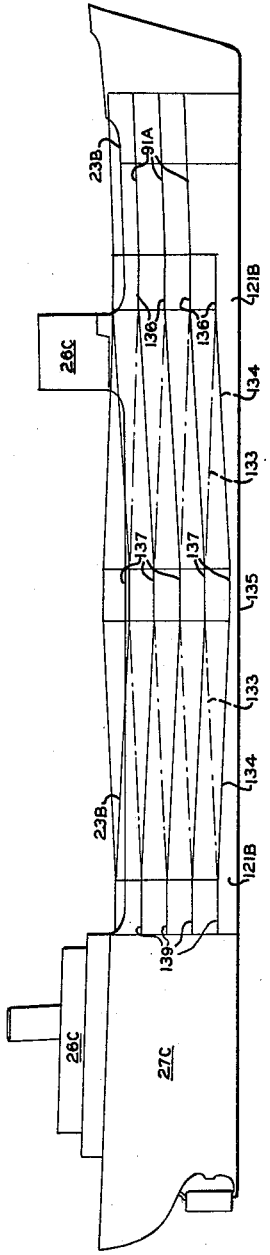
FIGURE 16 is a vertical profile view of the inclined cargo deck arrangement in a tanker-type ship.

Referring to FIGURES 16 and 17, the inclined decks 133 and 134, transfer decks 136, 137 and 139, and decks 91A, provide an interior system similar to that described previously and embodied in the basic ship design of FIGURES 1, 2, 3 and 4, and also in FIGURES 11 and 12.

The bridge and accommodations 26C are essentially the same as those described for 26 in FIGURE 1.

The engine room arrangement 27C is similar to that previously described for 27B in FIGURE 13.

Figure 19:
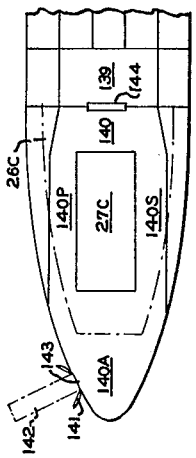
FIGURE 19 is a plan view of the FIGURE 18 modification.
Figure 18:
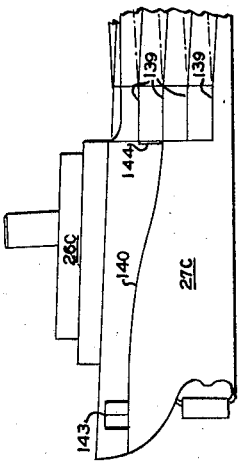
FIGURE 18 is a sectional stern profile modification of FIGURE 16, showing a stern feeder ramp.

Referring to FIGURES 18 and 19, an alternative stern ramp arrangement 140 is illustrated, which would provide an access 144 to the inclined deck arrangement via transfer deck 139. This arrangement permits loading of lower levels by using a stern ramp 142 from a terminal through a stern port 143 and thereby improves loading or discharge capabilities from the lower inclined decks in the ship. The stern port 143 with side-port doors 141 is illustrated in FIGURE 19 on the port side only. A similar side-port may be included on the starboard side in the same relative position. Thus the feeder ramp 140 may readily feed via the starboard and port sides of the engine room and boiler casing 27C as illustrated by 140S and 140P in FIGURE 19. This type of arrangement permits the flow of cargo, including vehicles, into and out of the ship simultaneously.

In this embodiment for a tanker it is probable that the entire inclined deck system would normally be incorporated into the ship's hull in that area between the wing tanks 131P and 131S, FIGURE 17.

It will, however, be understood that the decks 134 may be located in the wing tank area and that decks 133 may be located in the central tank area. Water-tight doors, as heretofore indicated, may be located appropriately in the deck area to insure water-tight integrity and to limit the free surface area of liquid cargo.

It can be seen that a ship with this type of configuration could easily be used to carry both bulk and general cargoes. The areas 121B, FIGURE 16, represent bunker and other similar areas to those previously described for 121 of FIGURE 11.

It will readily be seen that in tanker-type ships the inclined decks 134 will conform generally to the sheer line of the ship.

Figure 20:
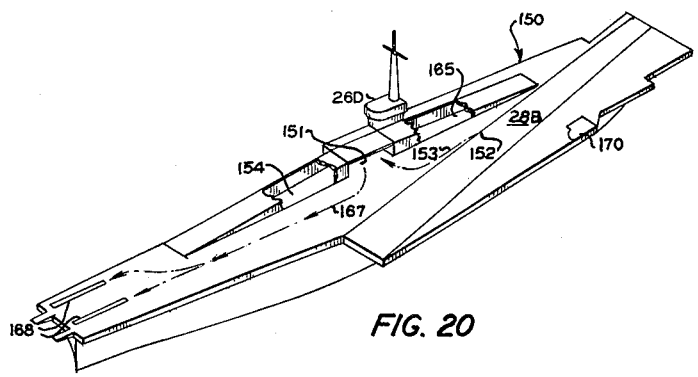
FIGURE 20 is a perspective view of an aircraft carrier embodying a modification of the present invention.
Figure 22:
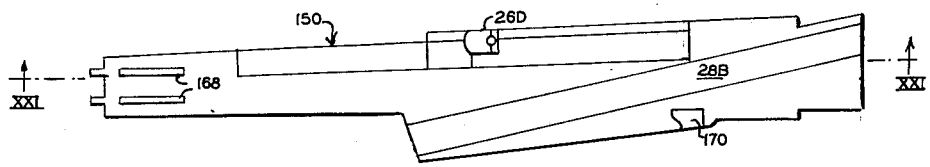
FIGURE 22 is a plan view of the flight deck of the aircraft carrier.

Referring to FIGURE 20, the aircraft carrier 150 has a normal flight deck arrangement 28B. The inclined deck arrangement is incorporated into the ship along the side normally including the conning tower 26D. The forward inclined deck 154 slopes downward toward the bow from amidships. The after inclined deck 165 slopes downward toward the stern from amidships.

It can be seen in FIGURE 20 of this embodiment that planes landing on the flight deck 28B at point 152 may be readily moved along the arrow 153 to the inclined deck access and directed downward into the ship via the forward inclined deck 154 to lower decks where such planes normally are stored, serviced or repaired. Planes taking off from the ship normally would be fed to the flight deck via inclined decks 164 and 165, or the latter alone, along arrows 167 to launching positions 168. In this manner a continuous flow of aircraft may be maintained from and to the flight deck without the need of elevators. As has previously been pointed out, the inclined deck is of relatively gentle slope, but nevertheless, conveyor systems may be incorporated to assist in the movement of aircraft.

An elevator, if desired, could be included in area 170, FIGURE 20, and at other convenient positions. The installation of this inclined deck arrangement is not intended to replace elevators so much as it is to supplement them. The major advantage in the system would be that derived through the ability to maintain a continuous flow of aircraft and to obtain increased aircraft storage space. A great advantage to this inclined deck arrangement resides in the ease of repair and resistance to major disabling effects of battle damage as contrasted to the problems of maintenance and difficulty in repair connected with elevator systems.

Figure 21:
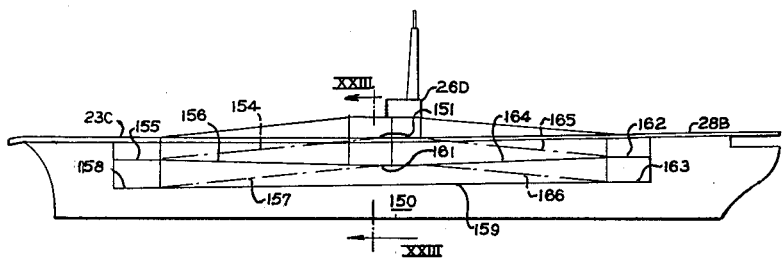
FIGURE 21 is a vertical profile view of the aircraft carrier along section line XXI—XXI of FIGURE 20.

Referring to FIGURE 21, planes will reach the flight deck 28B at transfer deck 151. The feed into the ship may be downward via the forward inclined deck 154 to transfer area at 155 and thence inboard onto deck 156. Deck 156 may be inclined in conformance with the slight sheer of the ship or it may be a normal deck parallel to the base line. Deck 164 is a continuation of deck 156.

Further transfer to a lower deck level 159 may be via the forward transfer area 161, through the forward inclined deck 157, and through transfer area 158. Movement upward from deck 159 may take place via after transfer area 163, inclined deck 166, transfer area 161, deck 164, transfer area 162 and finally inclined deck 165 and transfer area 151 to the flight deck 28B.

Figure 23:
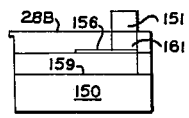
FIGURE 23 is an amidships section on the line XXIII—XXIII of FIGURE 21.
Figure 30:
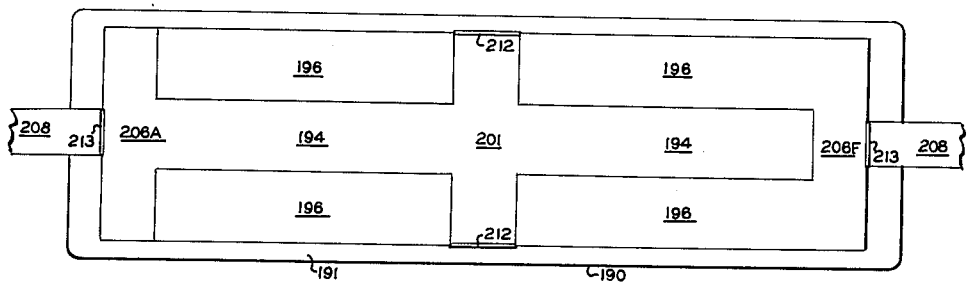
FIGURE 30 is a plan view in section of the barge, taken on lines XXX—XXX in FIGURE 29.

FIGURE 23, the section XXIII—XXIII of FIGURE 21, illustrates that the inclined deck arrangement may readily be accommodated along the side of the ship. As the incline of the decks described herein is so slight in relation to a parallel deck, such decks not only serve the purpose of transfer between deck levels but also act as stowage decks permitting the aircraft to be in a position to be moved rapidly to launching sites in an emergency.

The width of the decks and the distance between them is governed by the size and type of the aircraft employed.

This system also permits aircraft to be maintained under cover, thereby avoiding nuclear fallout, leaving decks clear for washdown systems, yet still permitting more rapid delivery to the flight deck than could normally be achieved by elevators.

Referring to FIGURES 24 through 28, the submarine 174 has spaces 26E devoted to the conn, accommodations, etc., and the engine room is located in the area 27D.

The inclined deck arrangement may be incorporated in the submarine as illustrated with inclined decks 175 sloping upward toward the amidships area and the inclined decks 176 sloping down-ward toward the amidships area.

The transfer decks 182 and 188 in the forward part of the submarine and the transfer decks 184 and 187 in the after part of the submarine at the conjunction of the inclined decks serve to provide a change of direction in the cargo flow forward and aft as has previously been described in the basic design embodied in FIGURE 2.

The transfer decks 178, 179, 180 and 181 illustrated amidships serve the same functions as the comparable transfer decks described previously for FIGURE 2.

It is assumed that ballast tanks and other features peculiar to submarines will take up the peripheral spaces 186. No attempt is made to describe these features as they are not germane to the inventive concept.

Movement of the crew from forward aft may be accomplished along passageways 182S and 182P.

Cargo is normally handled through water-tight hatches 185S and 185P into and out of the submarine through side ports 183. It is noted that in place of two side ports, a single vertical access hatch may be incorporated into the hull in the transfer deck area 178, if desired. An important aspect of this invention is that it permits effective discharge and loading through a single hatch or port.

The inclined deck arrangement in this design illustrate how the continuity of the decks, forward and aft of the transfer area amidships, can be broken without having a detrimental effect on the continuity of flow of cargo from lower decks upward or vice versa. For example, a unit of cargo located at transfer deck 181 in the lowermost position in the boat may be moved forward and upward to transfer deck 188 via inclined deck 176 and then aft and upward via inclined deck 175 to transfer 180 at which point cargo may be directed forward or aft while it makes its way upward via inclined decks and transfer decks, finally reaching the position for discharge at transfer deck 178.

Preferably, the entire cargo handling arrangement is conveyorized. The size of the decks in a submarine is governed by the type of cargo handled and the general design of the boat.

It will be appreciated that a hatch access in the upper hull of the submarine and further vertical access hatches in the area of the transfer decks 178 through 181 permit cargo to be lifted from the lowest point of the submarine to the main hatch at the top deck. However, handling cargo vertically in this manner causes a break in the continuity of flow each time a unit is picked up and involves longer more awkward lifting through several hatch accesses. This is opposed to the continuous flow via mechanized or automatic systems previously described.

Referring to FIGURES 29 through 32, the inclined deck arrangement in the barge consists of decks 193, 194 and 195 along the center line section of the barge, inclined slightly upward toward the center of amidships section and joined to the central transfer decks 200, 201 and 202. The inclined decks 196, 197 and 198 would be located on the starboard and port sides, outboard of the central decks, and would be inclined slightly downward toward the amidships section joining the transfer decks 201, 202 and 203.

The system of inclined decks would also meet forward and aft at transfer decks 205F, 205A, 206A, 207F and 207A, respectively. It can be seen that through this system of inclined decks one could move cargo from the lowermost deck 203 to the uppermost deck 200 or vice versa via the inclined deck system without actually lifting the cargo. The entire inclined deck system may be prefabricated and installed or built into the barge 190.

The lowermost area 192 would include various structural members and appropriate water-tight subdivisions constructed in a manner familiar to those acquainted with the art of barge construction. The area 192 might also include a ballasting system suitable for trimming the barge fore and aft to change the inclination of the decks in order to expedite movement of cargo forward or aft into or out of the inclined deck cargo stowage area.

It must be pointed out that there are no controlling factors intended as necessary in respect to the width of the inclined decks or the size of the various transfer decks previously described. However, as heretofore explained for all embodiments, the incline must be gentle—preferably 4° or less and not more than 7° in the deck area. The dimensions of such decks will be governed by the type of cargo to be handled, the type of mechanized or conveyorized systems which might be installed, and/or the general design characteristics of the barge.

Various port accesses 211S and 211P, 212S and 212P and 213A and 213F are shown as possible loading or discharge points. It can be readily seen that other ports might be used in the transfer deck areas. Movement of cargo to and from the barge may be via ramps indicated by 208 and 210.

As has been previously described, it is noted that cargo could be loaded or discharged completely through any single port access.

Figures 31, 32:
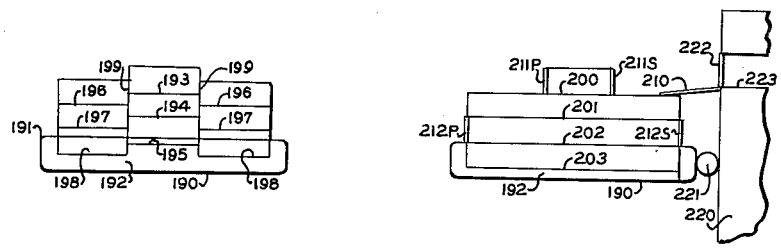
FIGURE 31 is an amidships view in section, taken on line XXXI—XXXI of FIGURE 29.
FIGURE 32 is a view in section, taken on line XXXII—XXXII of FIGURE 29.

Referring to FIGURE 31 specifically, the entire cargo of the barge may be loaded from a ship 220 through its port access deck 223 through side-port 222 over ramp 210 through the barge side-port 211 into the barge via transfer deck 200 and thence moved to a final stowage position anywhere in the barge by using appropriate inclined decks and transfer decks. The side ports 212 may be similarly employed. A camel 221 separates the barge from the ship's side.

The sketches in FIGURES 29 through 32 do not necessarily apply to any specific size of barge and are not intended to indicate an inclined deck configuration involving any specific number of inclined decks or transfer decks. It can be seen that the number of decks, the angle of the inclines and the general shape of the barge need only be governed by the design requirements or cargo requirements for which the barge is intended; more or fewer decks might be used. The inclined deck arrangement may be higher or lower in the barge than that indicated in FIGURE 29. This, in turn, would govern the height of spaces 192 in the body of the barge.

No details of the actual deck construction are illustrated. It can be seen that the materials used in the decks, the size and weight of decks, methods of fastening or securing the decks, etc., would be governed by the engineering requirements dictated by the purpose for which the barge was intended or the location in which the barge would be employed. For example, the materials used in a barge to be employed on fresh water lakes and rivers would be different than those required in a barge to be used on salt water. In respect to the construction, it must be further noted that the bulkheading 199 between the central inclined decks 193 through 195 and the outboard inclined decks 196 through 198, indicated in FIGURE 32, could be either solid in nature or might simply consist of suitable or appropriate vertical columns or members, lattice work, expanded metal, etc., to achieve the necessary support and separation between the two deck inclinations.

It would appear that a barge of this type would be highly desirable for the movement of cargoes from port to port on rivers, lakes or possibly in intercontinental trade. Its shallow draft would permit it to move to almost any harbor facility with little concern for depths of water, which might be encountered. This barge could be propelled by suitable outboard propulsion means.

It is further noted that the automatic systems installed in this barge could be of such a nature that they would not necessarily require a power supply system in the barge itself and such power required to actuate the installed automatic systems could be provided by either the terminal facility or the ship which might be loading or discharging a cargo.

No specific automatic handling system is indicated due to the number and variety of materials handling systems which might be incorporated into the barge as an adjunct to the deck arrangement or incorporated into the actual deck construction built into the barge. Such systems, as previously mentioned, may include overhead mono or multi-rails, deck rails, chain, belt or vibrating conveyors, roller conveyors incorporating various idlers, etc.

Vehicles or other rolling devices could readily move about the deck arrangement embodied in this barge design. Although the transfer decks 205 through 207 are shown rectangular, such decks might well be semicircular in design, similarly illustrated by 48 of FIGURES 1 and 4, which would provide easy turning circles for vehicular cargo to move from one inclined deck to another.

Figure 29:
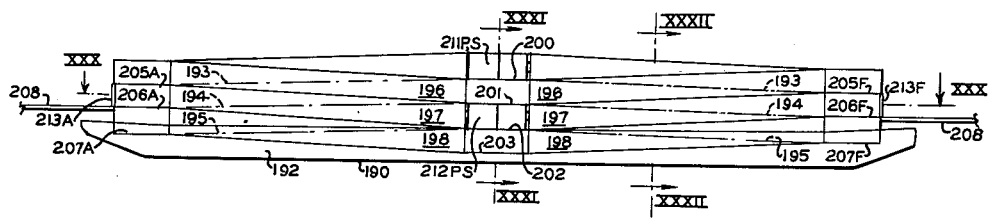
FIGURE 29 is a vertical profile view of a barge embodying this invention.

It must be pointed out that cargo may be handled readily as a string of units almost as long as the barge in length. A study of deck 194 in FIGURE 29 shows how such length could be achieved by permitting cargo to stretch from transfer deck 206A to 206F along the central portion of the barge. It can be seen that similar long units could be arranged on the outboard inclined decks.

Imagination of those normally involved in the problems of materials handling will easily appreciate the flexibility and unusual capabilities of the inclined deck system described for the barge or any of the previous ship designs described.

One advantage of this particular invention in respect to barge operations is that a barge located alongside a ship could handle the entire cargo from or to the ship through one cargo access without the necessity of shifting the barge along the side of the ship, thereby eliminating waste of time in relocation and minimizing damage to the side of the ship or its appurtenances.

FIGURES 33 to 37 show another important basic concept of the invention. It will be recognized immediately by those skilled in the art that a barge or vessel 230 together with a tug or propulsion means 231 (shown in dotted lines in FIGURE 34) cooperate essentially the same as that shown in Comparative Ship Types for Handling General Cargo by John McDougall and Daniel T. Mallett of George G. Sharp, Inc., Society of Naval Architects and Marine Engineers, New York Metropolitan Section, March 1955 meeting, page 59 et seq. It will be understood, of course, that the vessel and tug may be integral. In the claims, it is intended that the term "vessel" shall encompass barges.

The hull 232 of the vessel is substantially conventional except that it is bifurcated in its stern portion 233 so that it may receive the bow 234 of propulsion means 231 which is attachable and detachable from vessel 230 by conventional means known to those skilled in the art. Propulsion means 231 will contain the engine room, bridge, quarters, and all other facilities.

Figure 33:
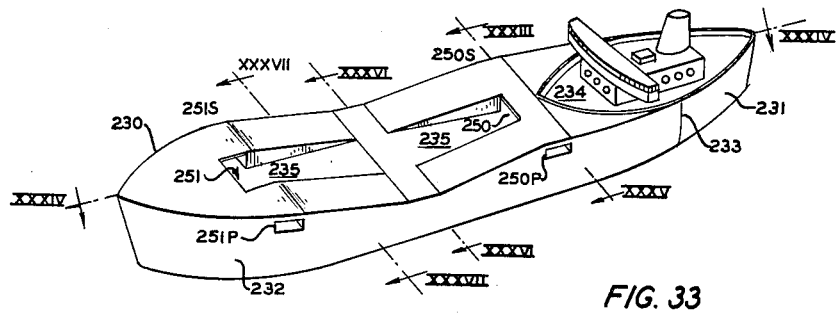
FIGURE 33 is a perspective view of a further barge embodying the present invention.
Figure 34:
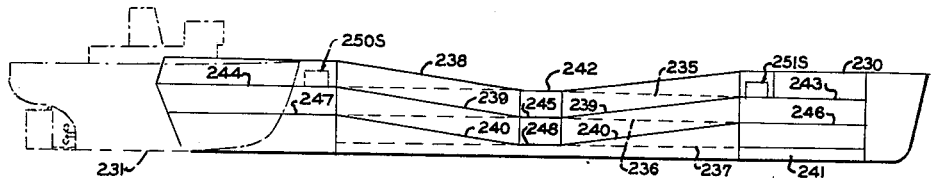
FIGURE 34 is a view in section taken on line XXXIV—XXXIV of FIGURE 33.
Figure 35:
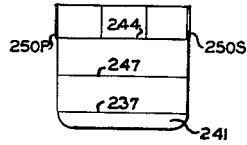
FIGURE 35 is a view in section taken on line XXXV—XXXV of FIGURE 33.
Figure 37:
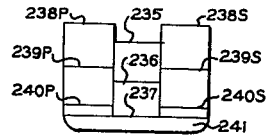
FIGURE 37 is a view in section taken on line XXXVII—XXXVII in FIGURE 33.
Figure 36:
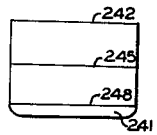
FIGURE 36 is a view in section taken on line XXXVI—XXXVI of FIGURE 33.

As will be observed in FIGURES 33, 34, and 37, there are first 235, second 236, and third 237 central decks and first 238, second 239, and third 240 starboard and port sheer decks, the starboard decks being identified by the addition of the letter "S" in the reference character and similarly the port decks by the letter "P." The decks may be secured in place in any conventional manner known to those skilled in the art, as, for example, welding or riveting to appropriately placed beams interconnected to the barge or vessel's structure. The double bottoms 241 run substantially the length of the vessel. Decks 238 and 235 meet and are in conjunction at only the amidships connecting area 242. Decks 235 and 239 meet at forward connecting area 243 and aft connecting area 244. Decks 239 and 236 meet only at the amidships area 245. Decks 236 and 240 meet at a forward connecting area 246 and an after connecting area 247. Sheer decks 240 and deck 237, which extends the width of the vessel, meet at connecting area 248. All the connecting areas 243, 244, 245, 246, 247 and 248 extend the width of the vessel.

Three access ports 250P, 250 and 250S are provided for entry to area 244. Three access ports 251S, 251 and 251P are provided for access to area 243.

Cargo may be loaded, unloaded and stowed in essentially the same manner as in prior embodiments of this invention.

Referring now to FIGURES 38 and 39, the vessel's general hull 290 is of a conventional type with the split-deck system incorporated therein as a main internal structural element of the vessel.

The bridge, and superstructure deck house 350A are aft in this embodiment to meet basic design specifications for an economical construction arrangement for a ship utilized for transportation of vehicles—particularly automobiles. The house 350A, accommodates in more refined form (not shown since this feature has no direct bearing on the invention), the navigation facilities, officers' quarters and such other spaces normally assigned in ships to such areas.

Crew berthing, messing spaces, ship's stores and other similar features for crew comfort and ship operation and maintenance are located on the after decks 343 and 344. This is not, of course, intended to indicate that such use is limited or restricted to this area.

The engine room in this design is located in area 350 which has a flue uptake to the stack rising vertically from the engine space through the superstructure 350A.

The cargo decks which take up the greater part of the interior of the ship are loaded through side ports 307, 327 and 328. These side ports are on port and starboard sides but are not restricted to the particular locations indicated. Considerable latitude in location can be tolerated in the cargo handling system of this invention. Additional side ports may be provided at other levels.

Figure 43:
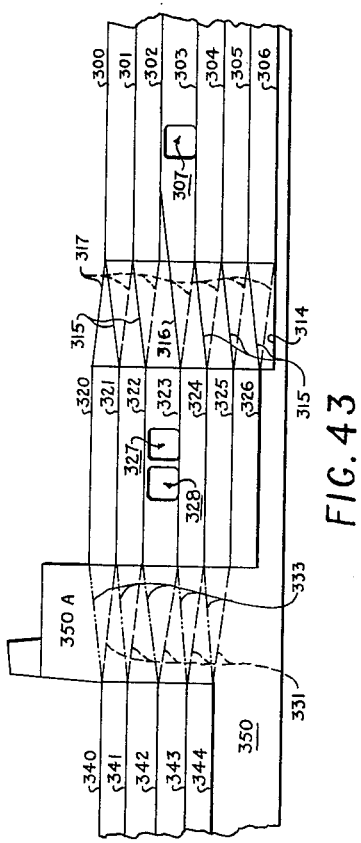
FIGURE 43 is a fragmentary inboard profile section showing a modification of the ship of FIGURE 38.

As will be observed in FIGURES 38, 39 and 43, the entire split-deck cargo structure is located primarily in the central portion of the ship. The system takes advantage of the fullness of the midship body to allow maximum cubic space for cargo.

Referring particularly to FIGURE 38, the forward decks 300, 301, 302, 303, 304, 305 and 306 are conventional decks. These decks may be parallel to the base line of the ship or could be slightly inclined upward and forward in a manner familiar to those acquainted with structural features of ship design.

The decks 315, 317 and 319 compose the forward elements of the split-deck system which are unique in ship design and which are part of the configuration of this invention. In FIGURES 38, 39 and 42, it will be noted that decks 315 form the central portion of the section. There is no specific width designated for these decks, such width being governed by the type of cargo for which the ship is to be designed; the width, however, preferably being an increment most efficient for pallet, container, auto or other unitized stowage. In the case of vehicles, adequate width is provided to permit at least two vehicles to pass abreast in normal progressive loading or discharge.

Referring now to FIGURE 38, it will be noted that decks 315 are connected to decks 320, 321, 322, 323, 324, 325 and 326. In this configuration, it will also be noted that the decks of this system are parallel to the base line of the ship and are basically conventional decks. A unique feature in the arrangement, however, is that these decks, including the main strength deck, are displaced by approximately the height of one-half deck in relation to the forward series of decks, specifically the decks 300 through 306, respectively.

Referring to FIGURES 38, 39 and 42, and specifically to decks 317P, 317S, 319P and 319S, it will be noted that these decks bound decks 315 on the port and starboard sides respectively. As mentioned earlier, in describing decks 315, there is no specific width demanded in the design and construction of these decks; the type of cargo for which the ship is designed largely governing same. In the instant design for the handling of vehicles, it is desirable to make these decks wide enough for two vehicles to pass one another. It will be observed in FIGURE 42 that the decks 319P and 319S are bounded on the outboard sides, port and starboard respectively by void spaces or tanks. These tanks are peculiar to this specific design and are provided for compartmentation to insure adequate safety of the ship in the event of collision or damage. It is proposed in considering this, or similarly constructed ships, that these voids or tanks be filled with foamed plastic or equivalent styrofoam or urethane foam, in order to improve the flotation of the vessel, increase strength and minimize maintenance requirements. This feature, although common in small boats and craft, is not in ships of a size utilizing the invention. It can be appreciated that the size of the bounding tanks has a bearing on the widths employed in the construction and installation of decks 315, 319P and 319S illustrated in FIGURES 39 and 42. Referring again to FIGURE 38, it will be noted that decks 315, 317P, 317S, 319P and 319S join the series of decks 300 through 305 to the series of decks 320 through 326.

Comparing now the decks 315 to 317P, 317S, 319P and 319S, it will be seen in FIGURE 38, that while the decks 315 slope upward and forward, the decks 317P, 317S, 319P and 319S slope downward and forward from the central portion of the ship. The arrangement is such that the combination of decks form a manner of truss, improving and strengthening the ship longitudinally by placing the various deck members in tension and compression relative to one another in any condition of hogging or sagging of the entire hull structure as is often encountered in loading or unloading the ship, or while the ship is underway in a seaway.

The deck 314, illustrated in FIGURES 38 and 42 is essentially a continuation of deck 306 and serves to provide additional space for cargo, under decks 315. It further forms a part of the tank tops and is normal to conventional ship construction. This particular deck serves to improve cubic space utilization for cargo and contributes to the safety features of the ship.

Referring to FIGURES 38, 39 and 40 and studying particularly the after portion of the vessel, decks 340, 341, 342, 343 and 344 are conventional and generally parallel to the base line or slightly sloped upward and aft away from the central portion or midbody of the ship in a manner familiar to those acquainted with ship design and construction. Also in FIGURES 38, 39 and 40, it will be noted that the stack casing or "uptakes" 350A rises upward from the engine room 350. Portions of this casing are devoted to engine room spaces and compartments in the lower levels while the upper areas provide spaces for accommodations and support bridge areas which are not described or shown in detail since they do not necessarily have a bearing on the features pertinent to the invention.

It will be noted that the engine casing 350A is bounded on both sides by decks 331P, 331S, 333P and 333S, on the port and starboard sides respectively. Although four deck systems are portrayed, the decks 331P and 331S can be considered as single decks penetrated through their center by the uptakes 350A. Although the decks and engine uptakes are shown transversely dividing the area into approximately five equal parts or sections, it will be readily appreciated from FIGURES 39 and 40 that in application the uptake casing may be made narrower or slightly wider; and decks 331 may be made narrower or wider than decks 333. No rigid dimensioning is specified and dimensions of the width of the systems of decks and stack uptakes may be raised in each individual ship design.

In FIGURE 38, it will be noted that decks 331P and 331S slope upward and aft while decks 333P and 333S slope downward and aft from the central portion.

As all decks in FIGURES 38 through 42 are shown of equal height, all the decks shown on an angle forming the split-deck configuration are necessarily parallel to one another. This particular arrangement provides balance in respect to distribution of forces, creating a relatively rigid structure which is of prime importance and a basic consideration in this unique deck system.

Now looking generally at FIGURES 38 and 39, it will be noted that the forward decks 300 and 301, and the after decks 340, 341 and 342 are shown in FIGURE 39 as being rounded in the forward part and after part respectively. This rounding is portrayed as 295 forward and 345 aft. Such rounding is unique to the ship of the instant modification, but is not singular to the invention and other shapes such as square or geometric might well be utilized.

The split-deck configuration is not limited to decks of equal height as has been previously described and further portrayed in FIGURES 38 through 42. To illustrate a variation, FIGURE 43 has been included in this application as one possible modification.

Referring to FIGURE 43, it will be noted that the deck distance between 302 and 303 forward, 322 and 323 amidships, and 341 and 342 aft is deliberately greater than the other decks illustrated. This permits more latitude in the size of vehicles carried and other advantages of this feature will be readily appreciated by those familiar with the art.

In the forward system of the split-deck configuration it is to be noted that the decks have been maintained parallel to one another. In order to achieve this parallelism, the deck 316 has been deliberately extended in its juncture with deck 302. Deck 316 therefore, is slightly longer than the other similarly sloping decks, 315 of the system.

Looking now at the after deck system of FIGURE 43 in the area of the stack uptakes 350A, it will be noted that by deliberately maintaining the same longitudinal span of decks 331 and 333, the aforementioned parallelism is abandoned and the slopes have a tendency to vary as a result of the differences in deck heights. But, in any case, the basic concept of the configuration of the invention is maintained. Variations of this nature, of course, tend to complicate the structural application of the split-deck system. Where such variations are employed, the problems of design which arise are calculated and compensated for in a manner familiar to designers and builders skilled in the art of ship construction.

Further, in considering the configuration of the split-deck system as a whole, it will be understood that the entire system can be installed in a reverse manner. In other words, referring to FIGURE 38, it can be seen that by modification of decks 315 and 331P and 331S so that they slope down and forward rather than up and forward, and down and aft rather than up and aft, forward and aft from the central portion of the ship respectively, the entire split-deck system can be reversed. A cursory inspection of the figures will readily make this reversed arrangement of the system apparent. In certain specific designs, such reversal of the split-deck system might be desirable depending on the use for which the ship is to be employed. However, the basic configuration protrayed in the figures is preferred in that it permits the most effective use of the split-deck system for general use.

In the foregoing descriptions of various types of ships embodying the invention with the exception of the aircraft carrier as shown, it is important to understand that the basic conventional structural arrangement of large vessels has been radically modified. In the conventional hull, the main strength members comprise a more or less continuous main deck, the keel, and the hull with its frames. In the instant invention, the main deck has been split and coacts with other decks to provide a truss strength member. The function of the hull as a strength member is thus minimized and the keel and main deck are joined by other decks to form a truss. Aside from the advantages in cargo handling, the arrangement of decks in accordance with the invention provides a substantially more efficient use of a vessel's usual structural elements.

The above description and drawings disclose several embodiments of the invention and specific language has been employed in describing the several figures. It will, nevertheless, be understood that no limitations of the scope of the invention are thereby contemplated, and that various alterations and modifications may be made such as would occur to one skilled in the art to which the invention relates.

I claim:
1. A vessel comprising: a hull; rigid members within said hull; a first deck within said hull and interconnected thereto; a second deck within said hull interconnected thereto; said first deck and said second deck each having a transfer area with longitudinally divided first, second and third deck portions extending therefrom; the second deck portion of one of said decks meeting on the same level with the first and third deck portions of the other said deck; each said second deck portion disposed between said first and third deck portions; said deck portions of said first deck being vertically spaced from the corresponding deck portions of said second deck; the arrangement permitting cargo transfer between said deck portions; the pitch of all said deck portions not exceeding about 7° whereby the storage and movement of cargo thereon is facilitated; said deck portions extending through a substantial length of said hull and each connecting with at least one of said rigid members in a triangular truss arrangement thereby internally bracing said hull.

2. A vessel in accordance with claim 1 wherein the pitch of said deck portions is approximately 3°.

3. A vessel in accordance with claim 1 wherein said vessel is a fishing vessel, and includes motive means located in the after portion of said hull, and fish storage and processing space located on said deck portions in said hull forward of said motive means.

4. A vessel in accordance with claim 1 wherein said vessel is a whaler, and includes a whale loading port in said hull, said port connected to one of said deck portions.

5. A vessel comprising a hull, a keel in said hull, a first deck within said hull and interconnected thereto, a second deck within said hull and interconnected thereto, said second deck disposed generally under said first deck, said second deck partially divided longitudinally into two deck portions, one of said portions being centrally elevated and in its uppermost area joining said first deck, rigid members within said hull, said first deck and elevated deck portion connected with said rigid members to form triangular truss arrangements thereby bracing said hull through a substantial length thereof, said centrally elevated deck portion being inclined downwardly from each side of said uppermost area and continuously intersecting a vertical plane parallel to said keel, said centrally elevated deck portion also being of sufficient length and slight inclination whereby the storage and movement of cargo thereon is facilitated.

6. A vessel in accordance with claim 5 wherein the pitch of said centrally elevated deck portion is less than 7°.

7. A vessel in accordance with claim 6 wherein said vessel is an aircraft carrier, said first deck is a flight deck, and said second deck is a hangar deck.

8. A vessel in accordance with claim 6 wherein said second deck has a second longitudinal partial division whereby there is a third deck portion in said second deck, said centrally elevated deck portion being disposed between said third deck portion and the other deck portion.

9. A vessel in accordance with claim 8 wherein said vessel is a ship which is convertible from a cargo carrying ship into a tanker, including longitudinal bulkheads disposed at least partially between said deck portions, said first deck constituting a weather deck, and cargo entry means located in said weather deck, said cargo entry means connecting with said centrally elevated portion.

10. A vessel in accordance with claim 8 wherein said vessel is a cargo submarine, including a cargo access hatch in the upper portion of said hull, watertight doors covering said access hatch, said cargo access hatch connecting with said centrally elevated portion.

11. A vessel in accordance with claim 8 wherein said vessel is a barge and includes loading and unloading ports connecting with said second deck in the bow, astern, and amidships.

12. A vessel in accordance with claim 8, wherein said vessel is a barge, a bifurcated stern portion with said hull which is adapted to receive separate propulsion means.

13. A vessel in accordance with claim 6 wherein said first deck is centrally depressed wherein it joins with said centrally elevated deck portion by an amount approximately equal to the elevation of said elevated portion.

14. A vessel in accordance with claim 13 wherein said vessel is for carrying vehicles and includes a propulsion plant in the after portion of said hull and a port and the amidship's portion of said hull connecting with said second deck, whereby automobiles may be driven from said second deck to said first deck and stored thereon.

15. A deck structure in a vessel's hull which comprises two vertically spaced transfer and storage areas, two further vertically spaced transfer and storage areas which are spaced horizontally and longitudinally relative to said hull from said first mentioned areas, at least one of said latter areas being on a level medial relative to said first mentioned areas, a first storage deck portion connecting the lower of said first mentioned areas to the lower of said further areas, a pair of second storage deck portions which are spaced apart transversely relative to said hull connecting the lower of said first mentioned areas to the upper of said further areas, a third storage deck portion connecting the upper of said first mentioned areas to the upper of said further areas, the arrangement permitting cargo transfer between said deck transfer and storage areas via said deck portions, the latter being of slight inclination whereby the storage and movement of cargo thereon is facilitated.

16. A deck structure in accordance with claim 15 wherein said deck portions have a pitch of greater than 0° and less than 7°.

No references cited.